United States Patent [19]
Umemoto et al.

[11] Patent Number: 5,786,952
[45] Date of Patent: Jul. 28, 1998

[54] MAGNETIC DIGITAL STORAGE METHOD AND SYSTEM WHEREIN MAGNETIC TRANSITION POINTS IN ADJACENT RECORDED TRACKS ARE OUT OF PHASE WITH EACH OTHER

[75] Inventors: Masuo Umemoto, Tokyo; Yoshihiro Shiroishi, Hachioji; Reijiro Tsuchiya, Sagamihara; Kyo Akagi, Fuchu; Takehiko Hamaguchi, Omiya; Takashi Kawabe, Odawara; Atsushi Saito, Hino; Kouichirou Wakabayashi, Kokubunji, all of Japan

[73] Assignee: Hitachi, Ltd., Tokyo, Japan

[21] Appl. No.: 562,203

[22] Filed: Nov. 22, 1995

[30] Foreign Application Priority Data

Nov. 25, 1994 [JP] Japan ................... 6-291085

[51] Int. Cl.$^6$ .................. G11B 5/09; G11B 5/596
[52] U.S. Cl. .................. 360/48; 360/51; 360/77.08
[58] Field of Search ................... 360/22, 51, 48, 360/64, 77.08

[56] References Cited

U.S. PATENT DOCUMENTS

| | | | |
|---|---|---|---|
| 5,313,346 | 5/1994 | Shimotashiro et al. | 360/51 X |
| 5,410,435 | 4/1995 | Sakai et al. | 360/64 X |
| 5,426,539 | 6/1995 | Llewellyn et al. | 360/51 |
| 5,495,369 | 2/1996 | Rijckaert et al. | 360/48 |
| 5,526,200 | 6/1996 | Yada | 360/51 |

*Primary Examiner*—Aristotelis M. Psitos
*Assistant Examiner*—Regina Y. Neal
*Attorney, Agent, or Firm*—Antonelli, Terry, Stout & Kraus, LLP

[57] ABSTRACT

A magnetic digital storage method and system which can improve a recording density and can reduce a cross-talk upon reproducing. An inputted high-speed digital signal is converted to a plurality of low-speed digital signal sequences by a recording circuit and each of the low-speed signal sequence is recorded onto a plurality of adjacent recorded tracks of a recording medium by integrated parallel recording heads. One servo signal is commonly recorded to the plurality of recorded tracks. Further, when recording the digital signal to the adjacent recorded tracks of the recording medium, a delay of a signal that is applied to each recording head is adjusted such that the phases of magnetic transition points given by the recording signal in the adjacent recorded tracks are not identical in the circumferential direction.

10 Claims, 7 Drawing Sheets

MAGNETIC DIGITAL STORAGE METHOD AND SYSTEM WHEREIN MAGNETIC TRANSITION POINTS IN ADJACENT RECORDED TRACKS ARE OUT OF PHASE WITH EACH OTHER

BACKGROUND OF THE INVENTION

The present invention relates to a magnetic digital storage method and system and, more particularly, to a technique which is effective when it is applied to the improvement of a recording density.

Although an example of the relative position between a servo signal and a data signal in a magnetic disk has been disclosed in, for instance, JP-A-6-68623, corresponding to U.S. patent application Ser. No. 07/909,273 filed on Jul. 6, 1992; there has hardly been a change in a servo technique in the magnetic disk.

Namely, the servo signal is generally recorded for one recorded track which is formed in the circumferential or rotating direction of the disk.

In the magnetic disk, when setting a width of a recorded track to a narrow track width that is equal to or less than a few µm in order to improve the recording density (realization of a high density), a track width of a servo signal is also similarly narrowed.

When it is intended to reproduce the servo signal, in many cases, the relative position between the head and the recorded track is unavoidably deviated from the ideal position. A signal to noise ratio (S/N ratio) of the servo signal has to be set in consideration of a deterioration due to such a positional deviation.

When the track width becomes the narrow track width, however, an influence by the deterioration of the S/N ratio due to such a narrow width increases and it is difficult to correctly detect the servo signal.

When a guard-band is small and recorded tracks are formed at a high density, furthermore, a cross-talk component from the adjacent track increases.

In the conventional technique, there is used a detecting method such that a reproduced (or playback) signal from a low frequency region of a large cross-talk component is not detected.

Since the influence of the cross-talk increases more and more in association with the realization of the narrow track, however, it is not possible to cope with such an influence by only a signal process on the reproducing side.

Hitherto, an example of a method of preventing the cross-talk on the recording side is disclosed in J-PA-6-131614.

JP-A-6-131614 proposes a method whereby on the assumption that a clock pattern which has previously been recorded on a magnetic disk is reproduced and a digital signal is recorded synchronously with the clock pattern as a prerequisite, a phase difference is provided for the digital signal between the adjacent tracks and the signal is recorded.

According to the above method, however, since the clock pattern is used as a reference, the phases between the adjacent tracks at the positions away from the clock pattern depend on a fluctuation of the rotational speed of the magnetic disk.

Therefore, normal phases cannot be always assured between the adjacent tracks at a high linear recording density and a problem to be solved still remains in terms of the elimination of the cross-talk.

For example, it is now assumed that a diameter of disk is set to R, a fluctuation of rotational speed for one second is set to k, a normal rotational speed is set to p, and a rotational speed when there is a speed fluctuation is set to p+Δp. It is defined such that k =Δp/p. It is now assumed that the clock pattern is inserted every 90° of the disk and a difference between the rotational speed when a certain track is recorded and the rotational speed when an adjacent track is recorded is equal to Δp due to the rotational speed fluctuation.

In order to suppress the phase deviation between the adjacent tracks at a time point of 45° to ½ or less of a bit interval b, the following expression (1) must be satisfied.

$$\pi R k \times 45/360 < b/2 \qquad (1)$$

In this case, assuming that R=2.5 mm and b=0.5 µm, k<0.00025.

Although such a value can be realized by preparing an extremely high precision mechanism and servo system, a possibility such that they will be expensive is high.

Moreover, since one-channel recording is performed as a prerequisite, when the high-density recording is executed to realize a high-speed recording, a requirement against the rotational speed fluctuation further rises.

In addition, it is also considered that it becomes difficult to adjust the delay time giving the phase difference because of the high speed.

SUMMARY OF THE INVENTION

The present invention is made to solve the problems of the prior art as mentioned above and it is an object of the invention to provide a magnetic digital storage method and system which can improve a recording density.

Another object of the invention is to provide a magnetic digital storage method and system which can reduce a cross-talk upon reproduction.

The above and other objects and novel features of the present invention will become apparent from the following detailed description and the appended claims with reference to the accompanying drawings.

Typical aspects of the present invention will now be briefly explained as follows.

A magnetic digital storage method according to a first aspect of the invention includes the steps of converting a continuous digital signal to a plurality of digital signal sequences; recording the plurality of digital signal sequences to a plurality of adjacent recorded tracks of a recording medium by a plurality of integrated recording heads such that magnetic transition points given by the recording signals in the adjacent recorded tracks on the recording medium are different with respect to phases; reproducing the plurality of digital signal sequences recorded on the plurality of adjacent recorded tracks by a plurality of integrated reproducing heads (or playback heads); and converting the plurality of digital signal sequences reproduced by the plurality of reproducing heads to an original continuous digital signal.

According to a second aspect of the invention, in the first aspect, one servo signal is commonly recorded to the plurality of adjacent recorded tracks of the recording medium on which the plurality of digital signal sequences are recorded.

According to a third aspect of the invention, a magnetic digital storage system includes a recording circuit converting a continuous digital signal to a plurality of digital signal sequences; a plurality of integrated recording heads recording the plurality of digital signal sequences to a plurality of adjacent recorded tracks of a recording medium; a plurality of integrated reproducing heads (or playback heads) for reproducing the plurality of digital signal sequences recorded on the recording medium; and a (playback) reproduction processing circuit converting the plurality of digital signal sequences reproduced by the plurality of reproducing heads to an original continuous digital signal, wherein the recording circuit further includes a delay circuit delaying the plurality of digital signal sequences so that magnetic transition points on the adjacent recorded tracks are different with respect to phases.

According to a fourth aspect of the invention, in the above third aspect, the reproduction processing circuit executes a discrete process of a decision (or discriminating) interval of the plurality of digital signal sequences.

According to a fifth aspect of the invention, in the above third or fourth aspect, one servo signal is commonly recorded to the plurality of adjacent recorded tracks on which the plurality of digital signal sequences are recorded.

According to the operation of the first or third aspect, the high-speed digital signal which is inputted is converted to a plurality of low-speed digital signal sequences in the recording circuit, and the low-speed digital signal sequences are simultaneously recorded in parallel to the adjacent recorded tracks by the plurality of integrated recording heads.

The phase of the digital signal that is supplied to each recording head is adjusted so that the magnetic transition points are not identical in the adjacent recorded tracks.

Thus, the recording density can be improved and a cross-talk from each of the adjacent tracks can be reduced upon reproduction.

According to the operation of the fourth aspect, the reproduced (or playback) signal at an inherent magnetic transition point in each track is sampled by a sampling circuit of the reproducing (or playback) circuit.

Consequently, the cross-talk from the adjacent tracks can be reduced upon reproduction.

According to the operation of the third or fifth aspect, the one common servo signal corresponding to a plurality of recorded track widths is formed.

Therefore, with respect to the reproduction of the servo signal, a deterioration of the signal to noise ratio (S/N ratio) due to the realization of the narrow track does not occur and a high S/N ratio can be assured in a manner similar to the conventional method.

DETAILED DESCRIPTION OF THE PREFERRED EMBODIMENTS

Figure 1:
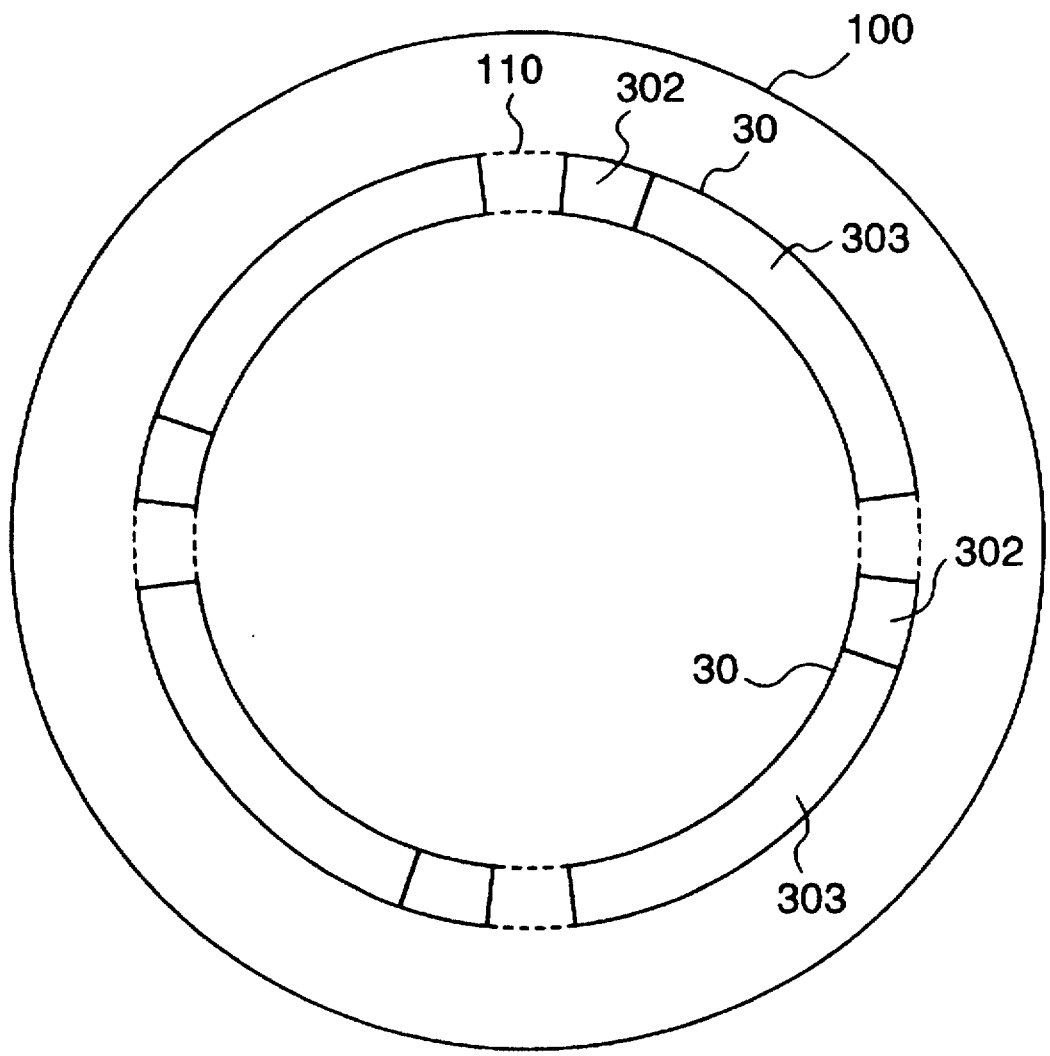
FIG. 1 is a diagram schematically showing an magnetic disk of a magnetic disk apparatus according to an embodiment of the present invention.

Embodiments of the present invention will now be described in detail hereinbelow with reference to the drawings. In all of the drawings for explaining the embodiments, the portions having the same functions are designated by the same reference numerals and their repetitive descriptions are omitted.

FIG. 1 diagrammatically shows an outline of a magnetic disk of a magnetic disk apparatus according to an embodiment of the invention.

As shown in FIG. 1, a plurality of concentric recorded tracks 110 are formed on the surface of a magnetic disk 100. Each recorded track 110 is divided into a plurality of sectors 30. Each sector 30 is constructed by a preamble region 302 and a data region 303. A timing clock signal, a servo signal, and a word synchronization signal indicative of the head position of data are recorded in the preamble region 302.

Figure 2:
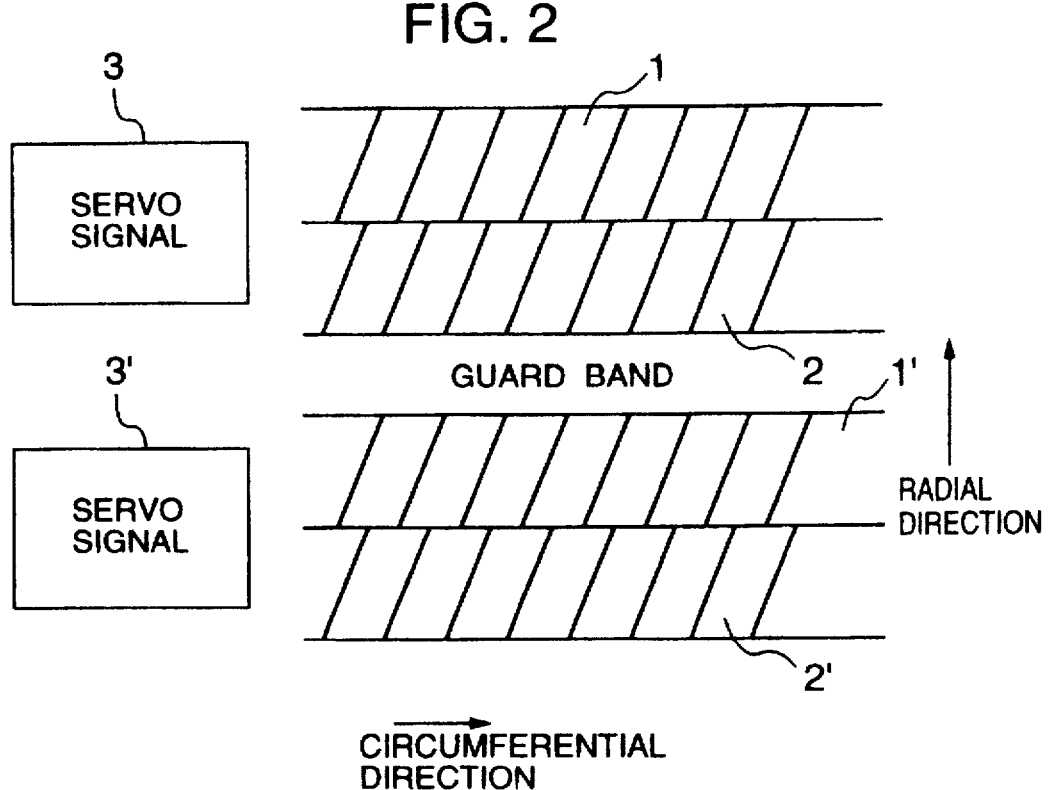
FIG. 2 is a diagram showing an enlarged view of a part of FIG. 1 and is a diagram showing the positional relation between recorded tracks and a servo signal recording region.

FIG. 2 diagrammatically shows an enlarged view of a part of FIG. 1 and shows the positional relation between the recorded tracks and the servo signal recording region. In FIG. 2, a circumferential direction and a radial direction are shown by arrows.

As shown in FIG. 2, the recorded track 110 is constructed of two recorded tracks 1 and 2. The two recorded tracks 1 and 2 are closely arranged without a guardband or so as to have a guardband which is small enough that it can be ignored as compared with a track width.

The two recorded tracks 1 and 2 are not individually recorded track by track, but are simultaneously recorded or reproduced by a plurality of recording/ reproducing (or playback) heads.

Therefore, those tracks are called parallel recorded tracks and are handled as if the two tracks were one track in the embodiment. A servo signal is not provided for each track but one servo signal 3 is commonly recorded for two recorded tracks 1 and 2. Since a conventional method can be used as a recording method of the servo signal 3, its description is omitted.

A guardband is provided between the parallel recorded tracks 1 and 2 and next parallel recorded tracks 1' and 2'. Reference numeral 3' denotes a common servo signal of the tracks 1' and 2'. By providing the guardband, there is obtained an advantage that a narrow track can be realized by using a conventional tracking technique.

Figure 3:
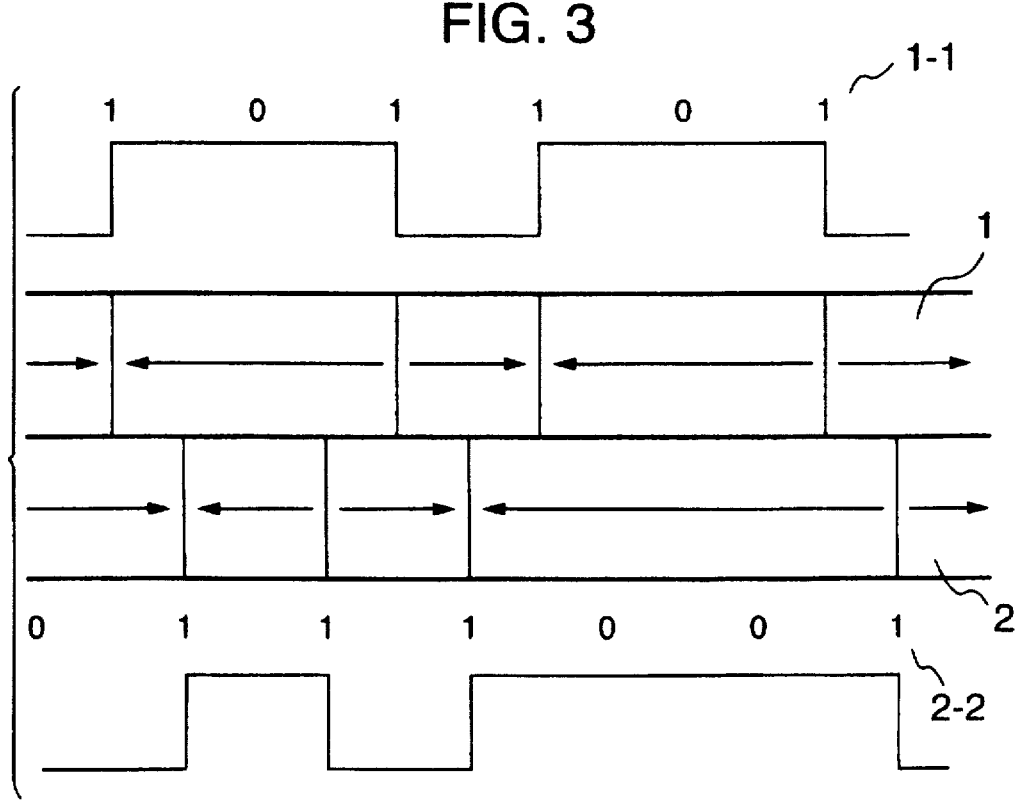
FIG. 3 is a diagram showing recording signals in recorded tracks 1 and 2 which are simultaneously recorded or reproduced and magnetic transition points.

FIG. 3 shows the recording codes, recording current, and magnetic transition points in the recorded tracks 1 and 2 which are simultaneously recorded or reproduced.

In FIG. 3, a reference numeral 1—1 denotes recording codes which are recorded to the recorded track 1 and 2—2 indicates recording codes which are recorded to the recorded track 2. An arrow shown in FIG. 3 indicates a magnetizing direction.

As shown in FIG. 3, a magnetic transition is recorded for a recording signal "1".

Phases of the magnetic transition in the tracks 1 and 2 differ by about 45° different, thereby preventing the magnetic transition points from being overlapped in the two tracks 1 and 2.

Figure 4:
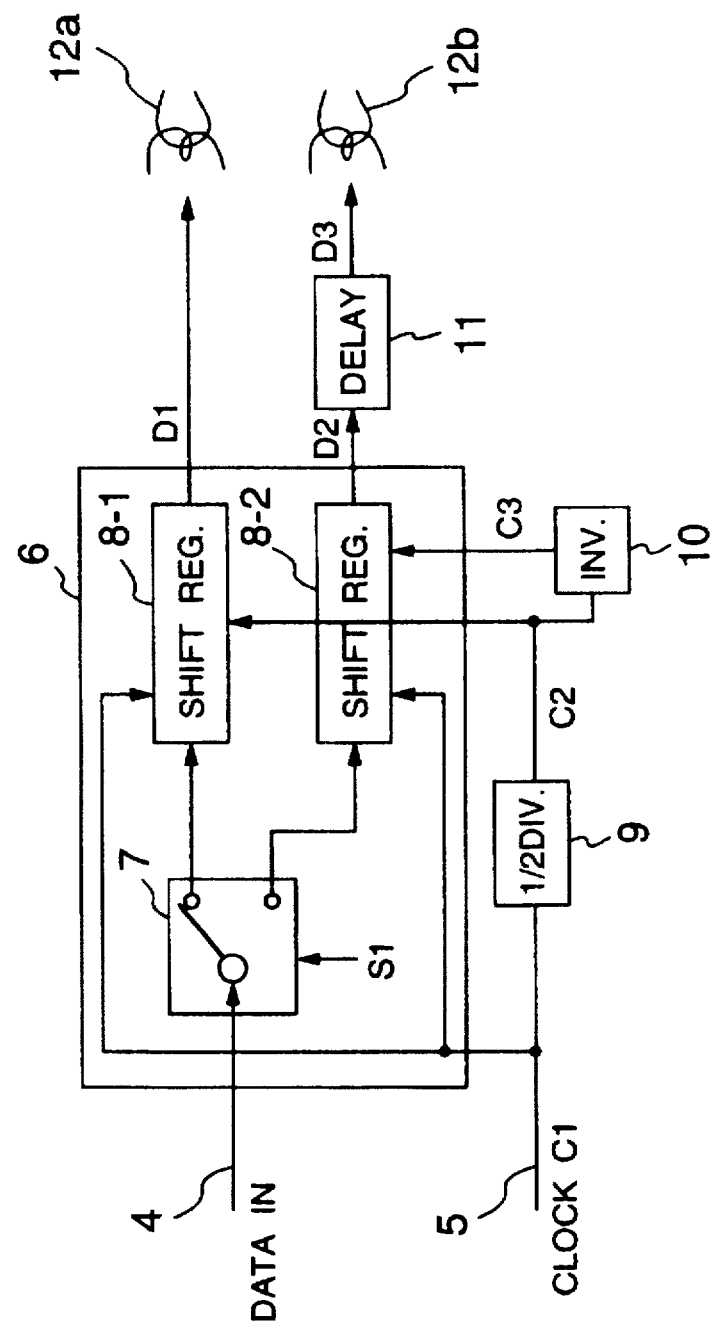
FIG. 4 is a diagram showing a signal processing system of a recording circuit recording recording patterns shown in FIG. 3.
Figure 5:
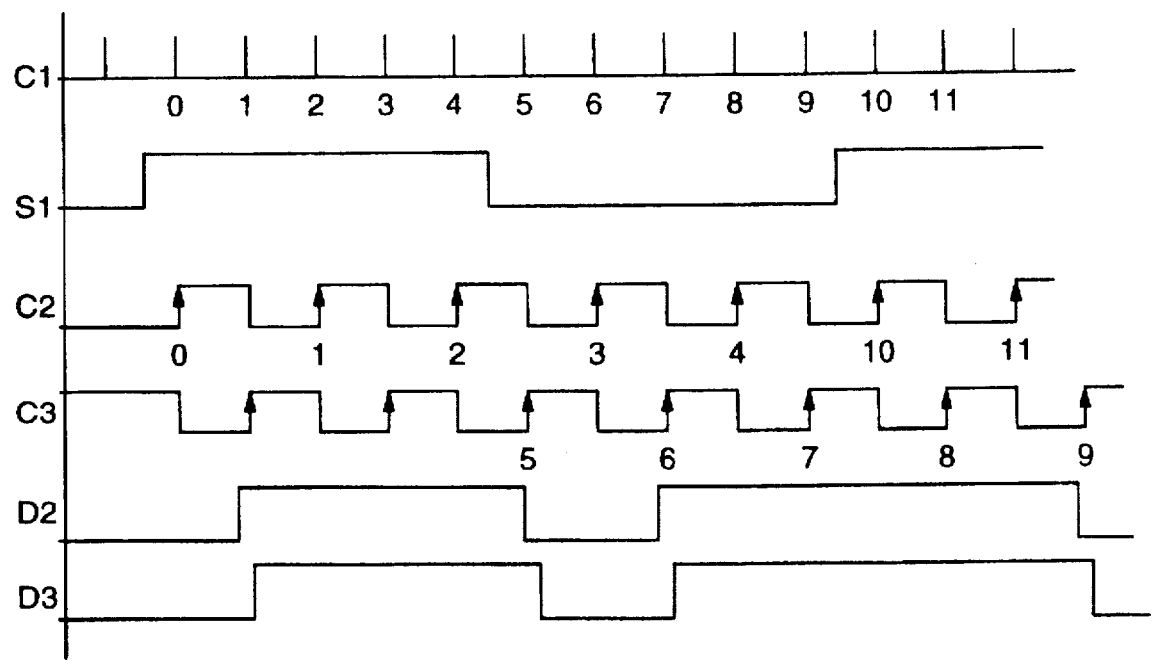
FIG. 5 is a diagram showing a signal waveform in each section of the recording circuit shown in FIG. 4.

FIG. 4 shows a signal processing system of a recording circuit for recording the recording patterns shown in FIG. 3. FIG. 5 shows a signal waveform in each section of the recording circuit shown in FIG. 4.

Signal processes of the recording circuit of the embodiment will now be described with reference to FIGS. 4 and 5.

As shown in FIG. 4, a high-speed digital signal 4 is inputted to a signal processing circuit 6 a parallel data sequence together with a high-speed clock signal 5 (C1) and is reconstructed to two low-speed digital signal sequences D1 and D2.

The high-speed digital signal 4 is distributed to two shift registers 8-1 and 8-2 on a plural-bit unit basis by a switching circuit 7 which is controlled by a switching signal S1.

In FIG. 5, the case where one word consists of five bits is shown for simplicity of explanation.

The high-speed digital signal 4 divided every five bits is read out by a clock signal C2 divided by a ½ count down circuit 9 and an inversion clock signal C3 inverted by an inversion circuit 10, so that the low-speed digital signals D1 and D2 are generated.

The low-speed digital signal D1 and a low-speed digital signal D3 which is derived through a delay circuit 11 are recorded to the magnetic disk (100 in FIG. 1) by two parallel recording heads 12a and 12b, thereby forming the recording patterns shown in FIG. 3.

The delay circuit 11 is used to correct the electrical relative position of the two magnetic heads. The electrical relative position will be described in detail hereinbelow.

Figure 6:
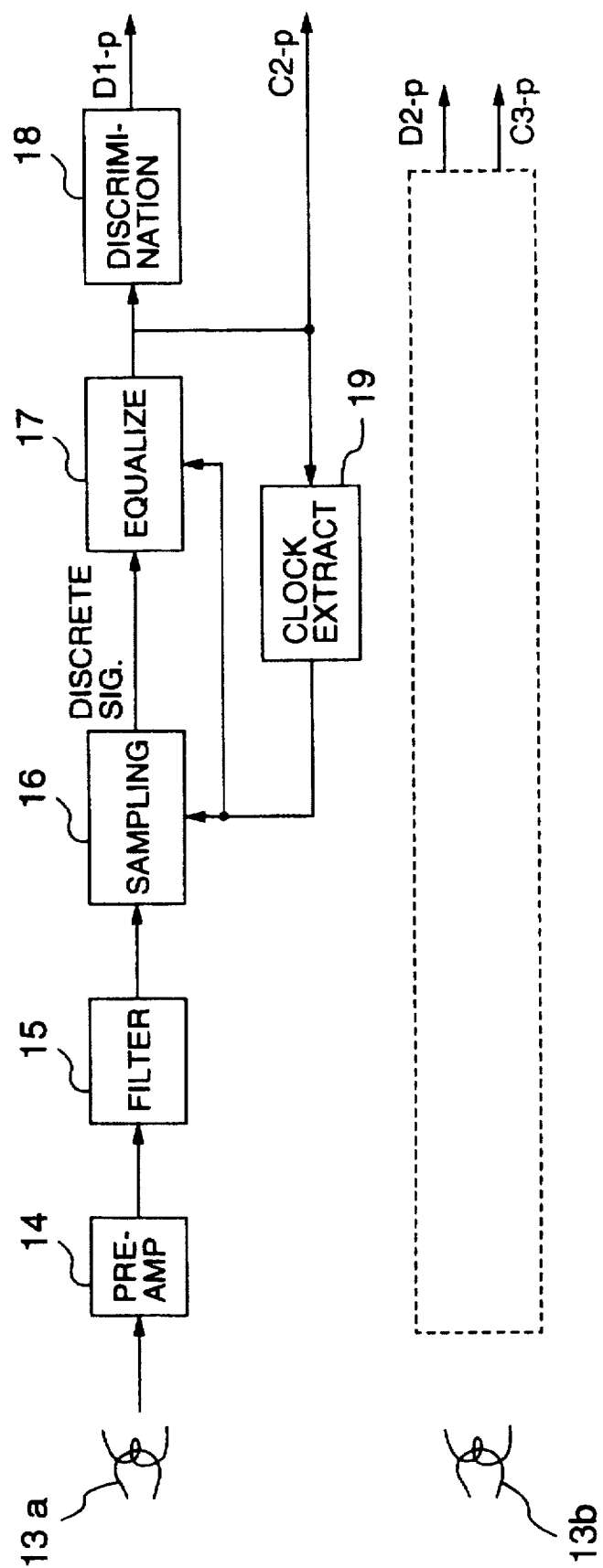
FIG. 6 is a diagram showing a signal processing system of a reproduction (playback) processing circuit in the embodiment, and shows a process for extracting a decoded clock signal from a reproduced signal.
Figure 7:
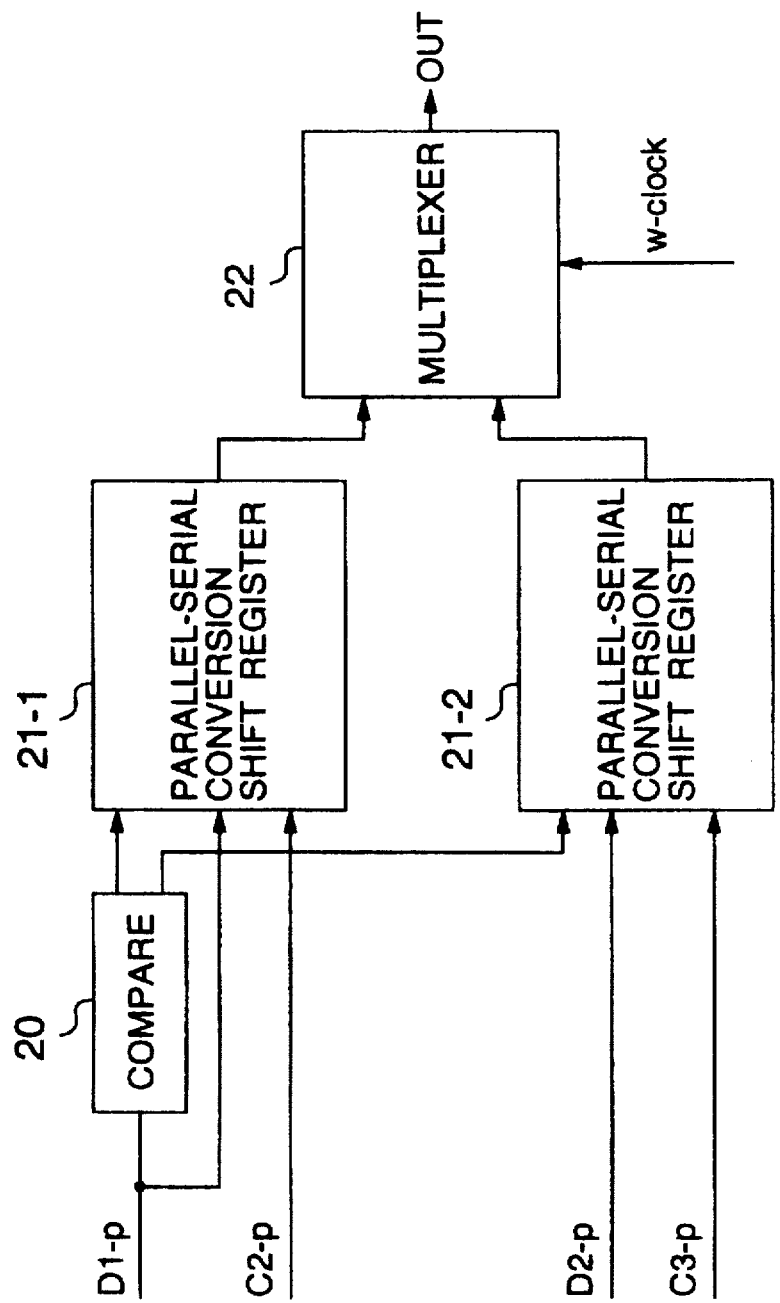
FIG. 7 is a diagram showing the signal processing system of the reproduction (or playback) processing circuit in the embodiment, and shows a process for mixing digital signals which were separated and recorded in parallel by two recording heads.

FIGS. 6 and 7 show a signal processing system of a reproduction (or playback) processing circuit in the embodiment.

FIG. 6 shows a process to extract a timing clock signal from a reproduced (or playback) signal. FIG. 7 shows a process for mixing the low-speed digital signals which have been separated in parallel and recorded by the two recording heads 12a and 12b.

In FIG. 6, the reproduced (or playback) signal which has been reproduced by a reproducing (or playback) head 13a is transmitted through a pre-amplifier 14 and a pre-processing filter 15 and is converted to a discrete signal by a sampling circuit 16.

The discrete signal sequence is supplied to a playback equalization circuit 17, by which frequency characteristics and phase characteristics which have been deteriorated by the recording and reproducing system are equalized to predetermined characteristics, so that an equalization output signal is generated.

A timing clock signal component synchronized with the reproduced (or playback) signal sequence is extracted from the equalization output signal by a clock signal extracting circuit 19. The reproduced clock signal C2-p from the clock signal extracting circuit 19 is fed back to the sampling circuit 16 and playback equalization circuit 17.

The equalization output signal of the playback equalization circuit 17 is decoded to an original low-speed digital signal D1-p by a decision (or discriminating) circuit 18. A reproduced (or playback) signal from a reproducing (or playback) head 13b is also similarly processed (not shown), so that a low-speed digital signal D2-p and a clock signal C3-p are derived.

The decoding process in this instance is not fundamentally different from the process which has been used hitherto. In other words, the decoding process is featured in that the invention can be applied without a change of reproducing (playback) circuit. However, a sampling in the processes is an indispensable process to eliminate the cross-talk.

A leakage magnetic field from the magnetic transition in each recorded track is detected by a reproducing head as a reproduced signal. The reproduced (or playback) signals from the parallel recorded tracks 1 and 2 are subject to digital signal processing such as equalization, decision (or discrimination), and the like.

Therefore, a sampling for the digital signal process is controlled so as to sample the reproduced (or playbacked) signal at a position where it is predicted that there is a magnetic transition in each track. Thus, in the adjacent recorded tracks, when the magnetic transition point can be set so as not to overlap in the circumferential direction, a sampling signal in each track is hardly subjected to the crosstalk from the adjacent tracks.

In FIG. 7, a comparing circuit 20 detects a word synchronization signal inserted in the signal. On the basis of such a synchronization signal, the serial digital signal D1-p is converted to parallel data of a word unit by a shift register 21-1 for a serial-parallel conversion.

Similarly, the signal D2-p reproduced by the magnetic head 13b is also converted to parallel data of a word unit by a shift register 21-2. The parallel data from shift registers 21-1 and 21-2 is alternately read out by a word clock signal w-clock controlling a multiplexer 22 and is integrated.

Figure 8:
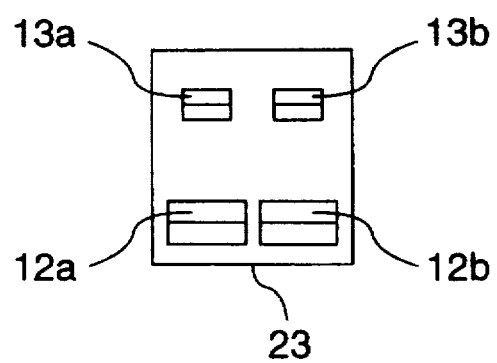
FIG. 8 is a diagram showing an example of an arrangement of recording heads 12a and 12b and reproducing (or playback) heads 13a and 13b in the embodiment.
Figure 9:
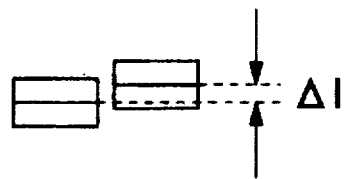
FIG. 9 is a diagram showing an enlarged view of a deviation between gap positions of the recording heads 12a and 12b shown in FIG. 8.
Figure 10:
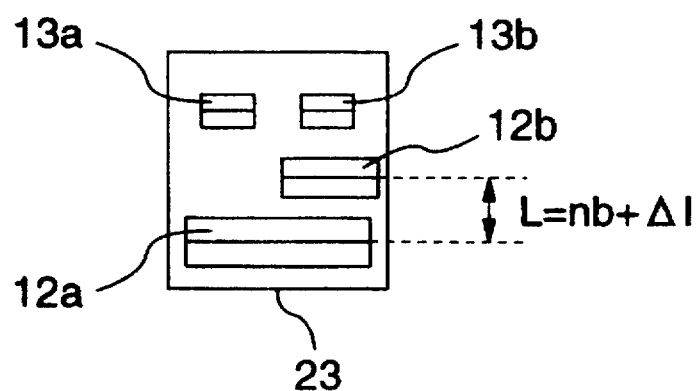
FIG. 10 is a diagram showing an example of an arrangement of the recording heads 12a and 12b and reproducing (or playback) heads 13a and 13b in the embodiment.

FIGS. 8, 9, and 10 show examples of an arrangement of the magnetic heads 12a, 12b, 13a, and 13b in the embodiment. In each diagram, a gap of each head is shown by a lateral line.

In the example shown in FIG. 8, the two recording heads 12a and 12b are extremely closely arranged on a composite head base 23 at an interval of, for example, 1 to 0.5 μm or less.

In the reproducing (or playback) heads 13a and 13b, a track width is set to be narrower than the recording head.

FIG. 9 diagrammatically shows an enlarged view of a deviation of the gap positions of the recording heads 12a and 12b shown in FIG. 8.

As shown in FIG. 9, now assuming that a displacement (an electrical relative position) is set to Δl, a relational equation with a delay time τ to correct it is expressed by the following equation 2 when it is assumed that a relative speed between the drum and the head is set to v.

$$\Delta l = v \times \tau \tag{2}$$

Since a permitted displacement δ on the recorded tracks 1 and 2 is considered to be about ½ of a recording bit length, a minimum delay time Δτ corresponding to the displacement δ is Δτ=0.25/10 =0.025 μsec, namely, 25 nsec from the equation (2) when it is assumed that the bit length b is equal to 0.5 μm and a relative speed is equal to 10 m/sec. Therefore, the minimum delay time can be sufficiently adjusted.

Now, assuming that the high density will be realized in future and the bit length is set to 0.1 μm, Δτ=5 nsec and the present invention can be sufficiently applied.

In the example shown in FIG. 10, the recording head 12a has a wide width and the recording head 12b overwrites onto the recorded track of the recording head 12a in the composite head base 23.

Therefore, a distance between the two tracks formed is ideally equal to 0. Actually, a substantial guard-band is slightly formed due to a leakage of the recording magnetic field extending in the track width direction of the recording head 12b.

A remaining value obtained by subtracting a value that is some integer times n as long as the bit length b from the interval L between the recording heads 12a and 12b becomes the displacement Δl of the electrical relative position. With respect to Δl, the delay time can be adjusted by considering the manner similar to the recording head in FIG. 8.

When using the zone recording such that the magnetic disk is divided into several zones in the radial direction and changing the bit length b in each zone, the adjustment of the delay time can be set in accordance with the zone. However, even when it is not set, since a deviation of the positional relation between the adjacent tracks is small, even if it is ignored, it does not become a serious defect.

According to the embodiment as mentioned above, there is provided the signal processing method for simultaneously recording in parallel to two channels by using the integrated composite head in the high density recorded tracks which hardly have a guardband.

Since a plurality of integrated recording heads are used, even if there is a rotational speed fluctuation in the magnetic disk, an influence by the rotational speed fluctuation appears commonly for the plurality of recorded tracks which are formed by the recording heads, and then the phase relation between the adjacent tracks of the magnetic transition can be maintained. Consequently, the system is not influenced by the rotational speed fluctuation of the magnetic disk and the high-speed signal that is twice as high as that in case of the one-channel recording can be handled. Further, since the clock signal pattern as in the conventional system is unnecessary, the disk can be efficiently used.

In the signal processing circuit 6 for parallel data sequence, a plurality of bits do not always need to be processed on a word unit basis but can be also processed on a unit basis of a bit or a plurality of words. Various units can be also used in the invention.

Although the present invention has been specifically described above on the basis of the embodiments, the invention is not limited to the above embodiments, but many variations and modifications are possible without departing from the spirit and scope of the appended claims of the invention.

In the present invention, effects which are obtained will be simply explained as follows.

(1) According to the invention, the high-speed digital signal that is inputted can be recorded onto the recording medium at a high density and the recording density can be improved.

(2) The cross-talk from each of the adjacent tracks can be reduced upon reproducing.

(3) With respect to the reproduction (or playback) of the servo signal, the deterioration of the S/N ratio due to the realization of the narrow track does not occur. A high S/N ratio can be assured in a manner similar to the conventional system.

(4) A part of the recording circuit, recording head, and reproduction (or playback) processing circuit can be constructed by a low-speed circuit.

What is claimed is:

1. A magnetic digital storage method comprising the steps of:

converting a continuous digital signal to a plurality of digital signal sequences;

recording said plurality of digital signal sequences onto a plurality of adjacent recording tracks on a recording medium as recording bits each having a recording bit length with a plurality of integrated recording heads;

reproducing said plurality of digital signal sequences recorded onto said plurality of adjacent recording tracks with a plurality of integrated reproducing heads; and converting said plurality of digital signal sequences reproduced by said plurality of reproducing heads to an original continuous digital signals;

wherein said step of converting a continuous digital signal to a plurality of digital signal sequences includes the step of delaying one of said plurality of digital signal sequences to be recorded onto one recording track of said adjacent recording tracks by a delay time smaller than a time corresponding to the recording bit length relative to another one of said plurality of digital signal sequences to be recorded onto another recording track of said adjacent recording tracks adjacent to said one recording track to cause a phase of a magnetic transition point in said one recording track to be different from a phase of a magnetic transition point in said other recording track adjacent to said one recording track when said plurality of digital signal sequences are recorded onto said plurality of adjacent recording tracks.

2. A method according to claim 1, wherein said recording medium is a magnetic disk; and wherein said plurality of adjacent recording tracks are a plurality of adjacent concentric recording tracks on said magnetic disk.

3. A method according to claim 1, wherein said plurality of adjacent recording tracks share one servo signal which is common to said plurality of adjacent recording tracks.

4. A magnetic digital storage system comprising:

a recording circuit for converting a continuous digital signal to a plurality of digital signal sequences;

a plurality of integrated recording heads for recording said plurality of digital signal sequences onto a plurality of adjacent recording tracks on a recording medium as recording bits each having a recording bit length;

a plurality of integrated reproducing heads for reproducing said plurality of digital signal sequences recorded onto said plurality of adjacent recording tracks; and a reproduction processing circuit for converting said plurality of digital signal sequences reproduced by said plurality of reproducing heads to an original continuous digital signal;

wherein said recording circuit includes a delay circuit for delaying one of said plurality of digital signal sequences to be recorded onto one recording track of said adjacent recording tracks by a delay time smaller than a time corresponding to the recording bit length relative to another one of said plurality of digital signal sequences to be recorded onto another recording track of said adjacent recording tracks adjacent to said one recording track to cause a phase of a magnetic transition point in said one recording track to be different from a phase of a magnetic transition point in said other recording track adjacent to said one recording track when said plurality of digital signal sequences are recorded onto said plurality of adjacent recording tracks.

5. A system according to claim 4, wherein said reproduction processing circuit includes a circuit for performing a discrete process of a decision (or discriminating) interval of said plurality of digital signal sequences.

6. A system according to claim 5, wherein said circuit for performing the discrete process of said reproduction processing circuit includes a sampling circuit for sampling said plurality of digital signal sequences reproduced by said reproducing heads, thereby generating a discrete signal.

7. A system according to claim 4, wherein said plurality of integrated recording heads simultaneously record in parallel said plurality of digital signal sequences onto said plurality of adjacent tracks on said recording medium; and wherein said plurality of integrated reproducing heads simultaneously reproduce in parallel said plurality of digital signal sequences recorded onto said Plurality of adjacent recording tracks.

8. A system according to claim 4, wherein one of said plurality of digital signal sequences is designated as a reference digital signal sequence; and wherein said delay circuit delays remaining ones of said plurality of digital signal sequences relative to said reference digital signal sequence such that magnetic transition points in each of said adjacent recording tracks do not coincide with magnetic transition points in any other one of said adjacent recording tracks.

9. A system according to claim 4, wherein said recording medium is a magnetic disk; and wherein said plurality of adjacent recording tracks are a plurality of adjacent concentric recording tracks on said magnetic disk.

10. A system according to claim 4, wherein said plurality of adjacent recording tracks share one servo signal which is common to said plurality of adjacent recording tracks.

* * * * *